(12) United States Patent
Harder et al.

(10) Patent No.: US 9,891,099 B2
(45) Date of Patent: Feb. 13, 2018

(54) OPTICAL DETECTOR AND SYSTEM THEREFOR

(71) Applicant: ELBIT SYSTEMS OF AMERICA, LLC, Fort Worth, TX (US)

(72) Inventors: James Anton Harder, Bedford, TX (US); Michaelene Williams Sprague, Coppell, TX (US)

(73) Assignee: Elbit Systems of America, LLC, Fort Worth, TX (US)

( * ) Notice: Subject to any disclaimer, the term of this patent is extended or adjusted under 35 U.S.C. 154(b) by 713 days.

(21) Appl. No.: 14/445,221

(22) Filed: Jul. 29, 2014

(65) Prior Publication Data

US 2017/0102264 A1    Apr. 13, 2017

Related U.S. Application Data

(60) Provisional application No. 61/860,015, filed on Jul. 30, 2013.

(51) Int. Cl.
  *G01J 1/04* (2006.01)
  *F41G 7/22* (2006.01)

(52) U.S. Cl.
  CPC .......... *G01J 1/0411* (2013.01); *G01J 1/0422* (2013.01); *F41G 7/226* (2013.01); *F41G 7/2293* (2013.01)

(58) Field of Classification Search
  CPC .......... F41G 7/226; F41G 7/2293; G02B 6/06
  See application file for complete search history.

(56) References Cited

U.S. PATENT DOCUMENTS

| 4,507,551 | A  | * | 3/1985  | Howard     | G01J 5/061   |
|           |    |   |         |            | 250/216      |
| 7,049,597 | B2 | * | 5/2006  | Bodkin     | G01J 3/02    |
|           |    |   |         |            | 250/336.1    |
| 7,527,437 | B2 |   | 5/2009  | Santos et al. |           |
| 2011/0285981 | A1 | * | 11/2011 | Justice | G01S 7/4813  |
|           |    |   |         |            | 356/4.01     |
| 2012/0012691 | A1 |   | 1/2012  | Dryer et al. |           |

* cited by examiner

*Primary Examiner* — Francis M Legasse, Jr.
(74) *Attorney, Agent, or Firm* — Conley Rose PC

(57) ABSTRACT

There is provided in a first form, a system including a detector and a reflector disposed about and proximal to the detector, at least of portion of the reflector being disposed in front of the detector. The reflector is configured to reflect at least a portion of the radiation directed to the system at an angle greater than a first predetermined value onto the detector, and the system is configured so that at least a portion of the radiation directed to the system at an angle less than the first predetermined value directly impinges on the detector.

9 Claims, 12 Drawing Sheets

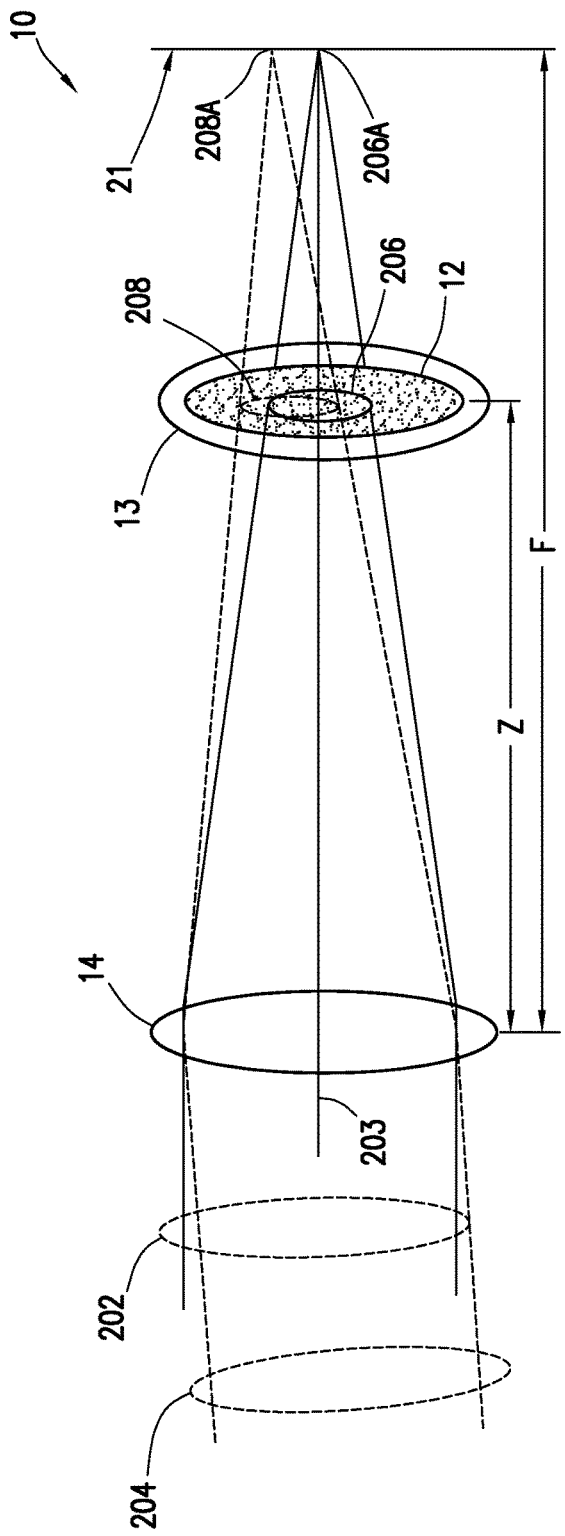
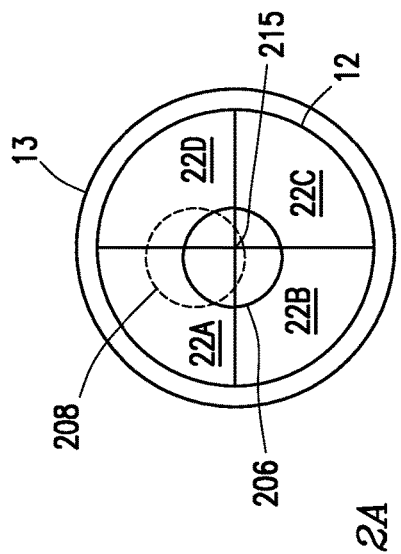
FIG. 2
FIG. 2A

OPTICAL DETECTOR AND SYSTEM THEREFOR

CROSS-REFERENCE TO RELATED APPLICATIONS

The present application claims the benefit of U.S. Provisional Application Ser. No. 61/860,015 filed Jul. 30, 2013 by James Anton Harder and Michaelene Williams Sprague titled "Light Pipe Sensor System" which is incorporated herein by reference as if reproduced in its entirety.

TECHNICAL FIELD

The present invention relates to optical sensors, and, in particular, to systems and methods for increasing the field of regard of the sensor.

BACKGROUND

In semi-active laser (SAL) sensor and similar optical sensor systems, energy from a distant source is collected by a condenser lens that converges the energy in the direction of a detector array. The usable field of regard (FOR) and field of view (FOV) may be limited by the size of the photoactive area of the sensor and the system f/number. Any system or method that enable increasing the FOR and FOV without increasing the detector diameter provides a competitive advantage in the marketplace.

BRIEF DESCRIPTION OF THE DRAWINGS

For a detailed description of exemplary embodiments of the invention, reference will now be made to the accompanying drawings in which:

FIG. 2 shows, in a side oblique view, further aspects of the system of FIGS. 1A and 1B;

FIG. 2A shows, in a front elevation view, a portion of the system of FIG. 2;

NOTATION AND NOMENCLATURE

Certain terms are used throughout the following description and claims to refer to particular system components. As one skilled in the art will appreciate, other companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

"Distant object" means, in the context of an optical system, an object the light from which (either as a source thereof or reflected thereby) may be represented in a geometric optic sense by rays that are substantially parallel.

"Field of regard" (FOR) means the field angle (or angles if the FOR is asymmetric) sensor in object space from which photons entering the detector's aperture will impinge on only 1 element of the sensor's detector array.

"Field of view" means, with respect to a detector array comprised of multiple elements, the maximum field angle (or angles if the FOV is asymmetric) in object space from which photons entering the detector's aperture will impinge on more than 1 element in the sensor's detector array.

"Light" means electromagnetic radiation having wavelengths shorter than about 1000 µm. Light as used herein is not limited to the portion of the electromagnetic spectrum detectable by the human visual system.

"Oblique pencil" means a pencil of light rays that intersects an axis of an optical system at a nonzero angle.

"Exemplary means "serving as an example, instance, or illustration." An embodiment described herein as "exemplary" is not necessarily to be construed as preferred or advantageous over other embodiments.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1A:
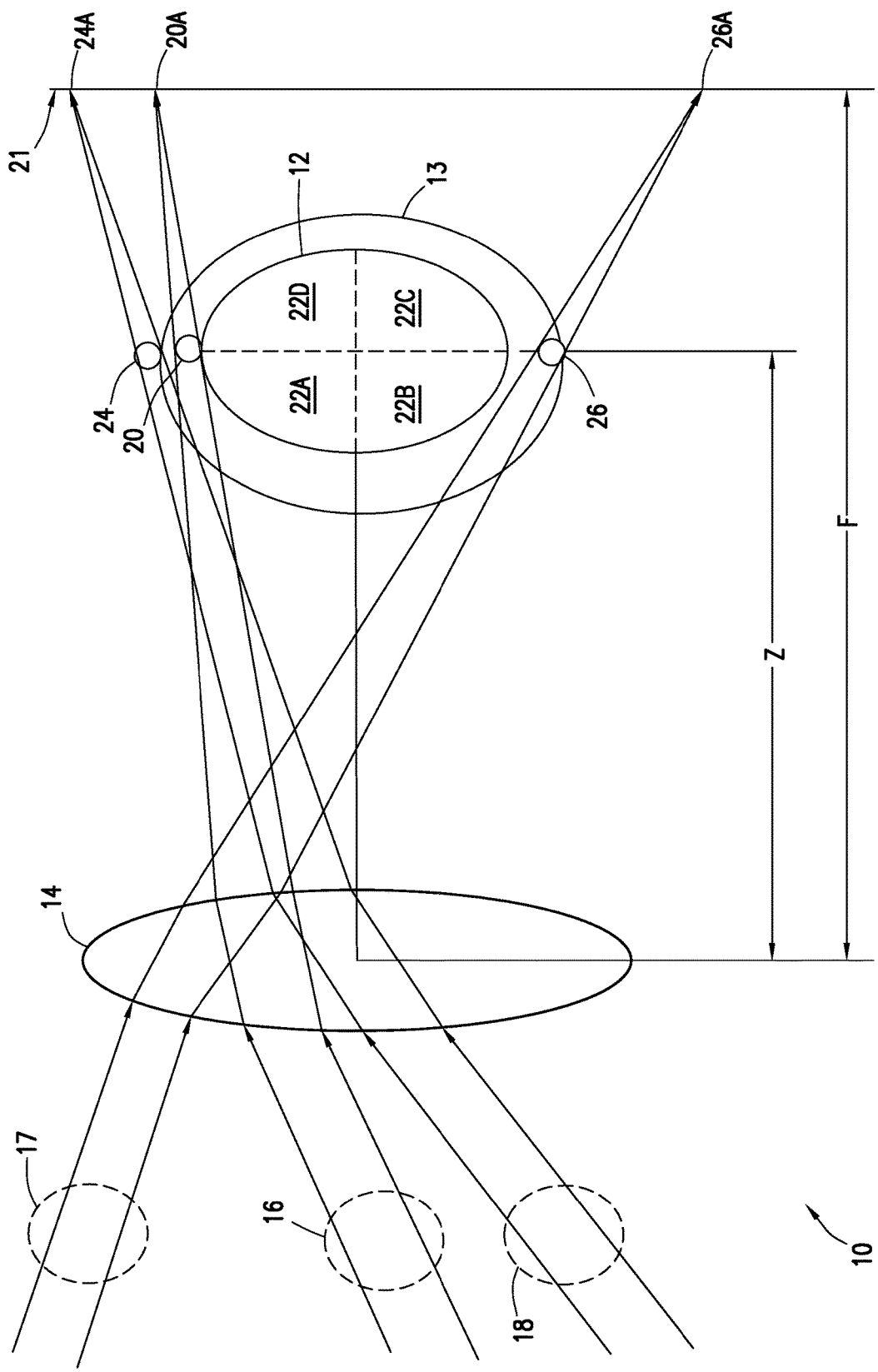
FIG. 1A shows a simplified schematic illustration of a sensor system in accordance with at least some embodiments of the disclosure.
Figure 1B:
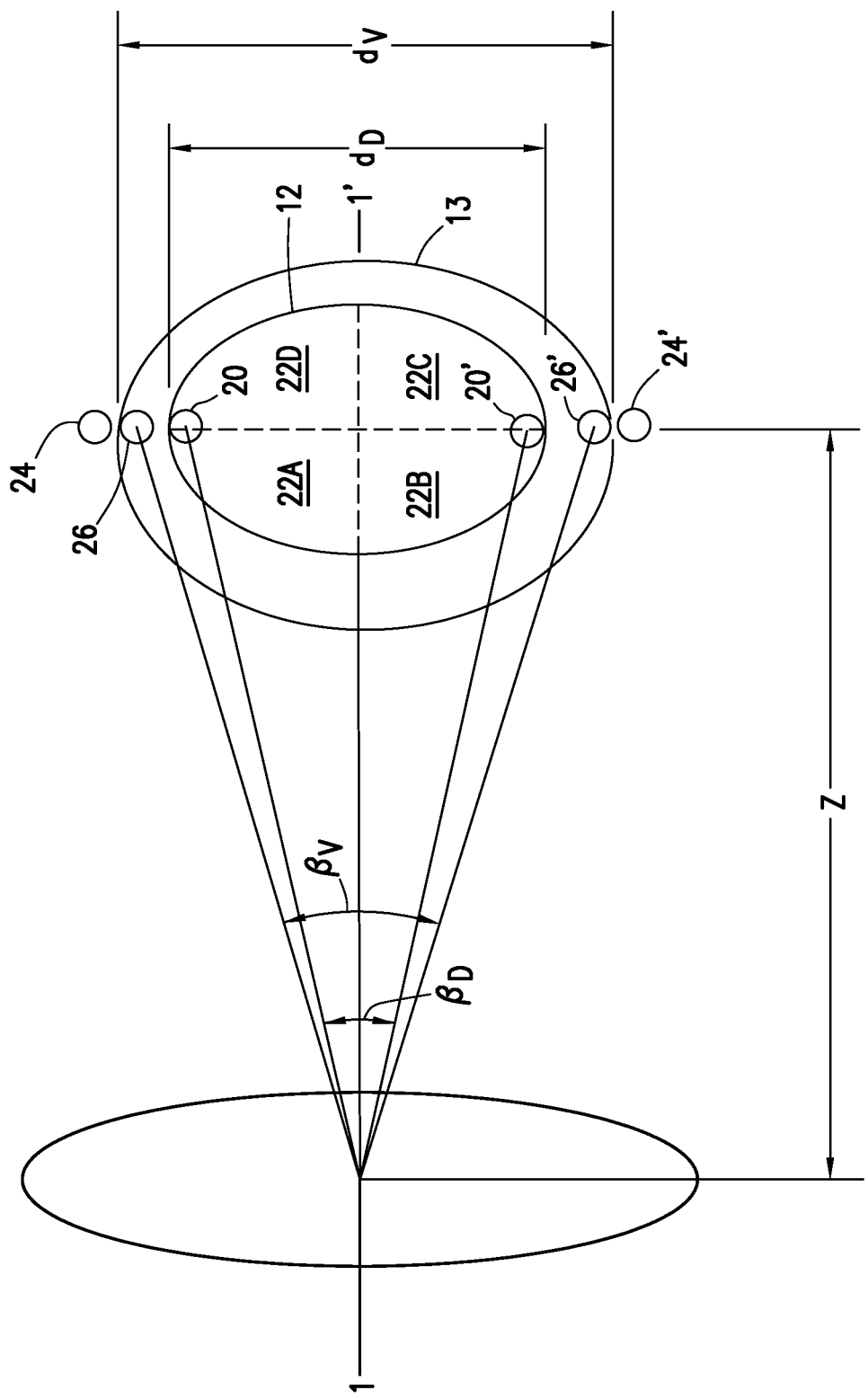
FIG. 1B shows further aspects of the sensor system of FIG. 1A

FIGS. 1A and 1B depict a schematic illustration of a sensor system 10 in accordance with an embodiment of the principles disclosed herein. In particular, FIGS. 1A and 1B demonstrate the geometric optic aspects of the disclosed embodiments. Referring first to FIG. 1A, system 10 includes a detector array 12, which for ease of illustration in FIG. 1 will be taken to be circular with a diameter d. In at least some embodiments, a detector array in accordance with the principles disclosed herein by include a plurality of elements, the size and geometry of which may be selected in accordance with a particular application of the detector system. In the example of FIG. 1, detector array 12 includes four elements 22A, 22B, 22C and 22D partitioning detector array 12 into quadrants. Detector array 12 including four elements is exemplary and other detector array embodiments having other numbers of elements would fall within the principles of the disclosure. Further detector array 12 may be comprised of a photosensitive material, such as a semiconductor. Further still, detector array may be comprised of photosensitive devices such as a photo-resistor, photo-conductor, photo-diode, photo-transistor, avalanche photo-diode or charge-coupled device. The aforementioned devices are exemplary, and the principles disclosed herein are not confined to particular photo-device embodiments.

Disposed in the vicinity of detector array 12 is reflector 13, which, in at least some embodiments, may be comprised of an annular reflective surface disposed so as to reflect light impinging on it onto detector array 12. The geometry of exemplary embodiments of reflector 13 will be further described in conjunction with FIG. 3 below. Detector array 12 together reflector 13 disposed in proximity thereto may be viewed as a "virtual detector" in the sense further described below.

A lens system 14 images objects onto detector array 12 and reflector 13. Again, for ease of illustration, lens system 14 is depicted as a single, simple, double-convex lens. It would be appreciated by those skilled in the art that any converging lens configuration may be used in embodiments of lens system 14. In the exemplary embodiment in FIG. 1, detector array 12 may not lie in focal plane 21 of lens system 14 which is taken to be at a distance F from lens system 14. Rather, detector array may be disposed between lens system 14 and the focal plane, at a distance denoted Z in FIG. 1.

Light from a distant object falling on detector system 10 may be imaged by lens system 14. Pencils of light rays emanating from three such objects are depicted by pencils 16, 17 and 18. For the purpose of illustration, the distant objects are taken to be disposed such that pencils 16, 17 and 18 are oblique pencils to detector system 10. A pencil of light rays from a distant object may be comprised of substantially parallel light rays as illustrated by pencils 16 and 18. (It would be understood that the distant sources of pencils 16-18 are not themselves seen in FIG. 1 by reason of scale.) Because detector array 12 may be positioned in front of the focal plane of lens system 14, the image at the detector array may form a "spot" having a diameter larger than would otherwise obtain if the detector array were positioned at the focal plane of lens system 14. Pencil 16 is imaged in image spot 20 that is depicted to lie at the periphery of detector array 12. Pencil 18 is imaged at image spot 24 which lies beyond the periphery of detector array 12, and reflector 13. (IN the paraxial limit, at least, these would be imaged on the focal plane, as points 24A and 26A, respectively.) Thus, the distant object that constitutes the source of pencil 18 would not be detected by sensor system 10 inasmuch as its image point does not impinge on detector array 12 or on reflector 13. As described further below, the source of pencil 18 lies outside the field of regard (FOR) of detector system 10. Pencil 17 is imaged at image point 26 at the periphery of reflector 13. (Pencil 17 would be imaged on the focal plane 21 as point 26A.) Thus, in accordance with at least some embodiments, the image of the object corresponding to pencil 17 may be reflected onto detector array 12 and be detected by sensor system 10. Consequently, in such an embodiment of sensor system 10, the FOR may be determined by the extent, or dimension, of reflector 13.

This may be further understood by referring now to FIG. 1B. FIG. 1B illustrates sensor system 10 as in FIG. 1A, depicting image spots 20, 24 and 26 in which the correspond pencils (16, 18 and 17 respectively) have been omitted for clarity. Assuming for simplicity that lens system 14 is rotationally symmetric about an axis 1-1', each of image spots 20, 24 and 26 have a corresponding complimentary image spots, 20', 24' and 26' respectively, symmetrically disposed about axis 1-1'. Denoting the extent of the reflector by $d_V$, and the FOR determined thereby as $\beta_V$, the FOR is then related to $d_V$ and the distance, Z from lens system 14 by:

$$\beta_V = \arctan(d_V/Z), \quad (1)$$

where, in accordance with standard notation, arctan is the inverse tangent function. The FOR in the absence of reflector 13, denoted $\beta_D$ based on the extent of detector array 12, $d_D$ is given by the same relationship as in Equation (1) with $d_V$ replaced by $d_D$. Thus, as set forth earlier, a sensor system including a detector array and reflector disposed as described as comprising a virtual detector and the combination of such a detector array and reflector may for convenience be referred to as a virtual detector.

Thus, the optical characteristics of sensor system 10 including a virtual detector in accordance with the embodiments disclosed are readily apparent. For sensor systems of a given distance, Z of the detector array 12 from the lens system 14, the FOR will be larger inasmuch as $d_V > d_D$. Conversely, the focal length of the lens system for a sensor system including a virtual detector may be longer than that of a sensor system without a virtual detector and having the same FOR, as a longer focal length can accommodate a larger distance Z. This then allows the use of a lens system having a larger aperture in that, for a given f/number, the lens system aperture that may be used is directly proportional to the focal length of the lens system. In other words, if the virtual detector allows the focal length to scale up by a factor, S, the aperture of the lens system may also scale by S and aperture area by $S^2$.

The foregoing has, for ease of illustration, referred to detector array and virtual detector characterized by a single dimension as would be reflected in a axisymmetric embodiment, for example. In other embodiments in which the detector array was not rotationally symmetric, the FOR may have different values associated with the geometry of the detector array. For example, with a rectangular detector array, the FOR might have different values, say $\beta_{Vx}$ and $\beta_{Vy}$, along the mutually perpendicular axes (which may be denoted x and y axes) of the rectangle corresponding to the two respective dimensions of the detector array.

If a portion of the energy incident on the detector array simultaneously impinges on multiple elements in the detector array, then the sensor can determine the angle of incidence of the radiation entering the sensor. Thus, for example in detector array embodiment comprised of four elements disposed in quadrants as in FIGS. 1A and 1B, the sensor may be able to determine the angle of incidence in either one or both of the mutually perpendicular defining the quadrants of the detector array. The maximum angle(s) of incidence within which such a determination may be made may define the field of view (FOV) of the detector system.

This may be further understood by referring to FIGS. 2 and 2A showing schematic illustration of a sensor system 10 and depicting further geometric optic aspects thereof. In FIG. 2, a pencil of rays 202 from a distant object taken to be on-axis (pencil parallel to axis 203) in elevation but off-axis in azimuth (not visible in the view of FIG. 2) is directed onto detector array 12 by lens system 14. The image of pencil 202 forms a spot 206 on detector array 12, as previously described in conjunction with FIGS. 1 and 1A. A distant object taken to be off-axis in both elevation and azimuth, depicted by a pencil of rays 204 is imaged by lens system 14 in a spot 208 on detector array 12. Spot 208 is displaced vertically relative to spot 206. At the focal plane 21 of lens system 14, spots 206 and 208 are imaged at points 206A and 208A, respectively. In the side view of FIG. 2, the azimuthal displacements of spots 206 and 208 are not visible but will be discussed below in conjunction with FIG. 2A.

Turning to FIG. 2A, there is depicted therein a front elevation view of detector 12. Detector 12 is comprised of four elements, 22A-22D in the exemplary embodiment shown. Elements 22A-22D partition detector array 12 into quadrants, and elements 22A-22D may equivalently be referred to as quadrants 22A-22D.

Recall spot 206 is the image of the pencil 202 by lens system 14, representing a distant object that is on-axis in elevation and off axis in azimuth. Portions of the electromagnetic energy contained in spot 206 fall on each of quadrants 22A-22D. Further, the centroid of spot 206 is seen to be centered vertically on detector array 12, reflecting the on-axis in elevation disposition of the distant object represented by pencil 202. However, the centroid of spot 206 is displaced horizontally from the center 215 of detector array 12, reflecting the off-axis in azimuth disposition of the distant object represented by pencil 202.

Consider now spot 208, depicting the image formed by lens system 14 on detector array 12 of pencil 204. Recall, pencil 204 represents a distant object that is off-axis in both elevation and azimuth. The centroid of spot 208 is displaced vertically from the center of detector array 12 (and the centroid of spot 206) as well as displaced horizontally from the center 215 of detector array 12. Nevertheless, portions of the electromagnetic energy of spot 208 are seen to still fall on each of quadrants 22A-22D. The relative amounts of the energy that impinges on the four quadrants is, however different than in the case of spot 206. This partitioning of the electromagnetic energy among the elements of detector array 12 may be used to determine the normalized FOV sensor system 10.

The FOV may be determined by the smallest angles in the x and y axes that satisfy the condition that the values of $\alpha_x$ and $\alpha_y$ as determined from Equations (2) and (3) below are each equal to 1, in absolute value (i.e. ±1):

$$\alpha_X = ((S_A + S_B) - (S_C + S_D))/(S_A + S_B + S_C + S_D) \quad (2)$$

$$\alpha_Y = ((S_A + S_C) - (S_B + S_D))/(S_A + S_B + S_C + S_D) \quad (3)$$

In Equations (2) and (3) the variables $S_A$, $S_B$, $S_C$, and $S_D$, represent the signals generated by the respective elements of the detector array 12, e.g. elements 22A-22D. Each of these signals is generated in response to the light falling in the respective quadrant which is comprised of the light imaged on detector array 12 as set forth above. The signals may be proportional to the optical radiation falling on the detector for a silicon detector. Likewise, infrared, ultraviolet and millimeter wave antennas may also operate such that the signals produced thereby are also proportional to the radiation impinging on them. As defined by Equations (2) and (3), $\alpha_x$ and $\alpha_y$ are normalized and the strength, or intensity, of the radiation impinging on the detector array does not affect the value of $\alpha_x$ and $\alpha_y$ (within the linear operating regime of the detector array). The values of $\alpha_x$ and $\alpha_y$ determined using Equations 2 and 3 for an object whose radiation is impinging on sensor may be used to determine an angle of incidence for that object. If $\theta_y$ is the angle-of incidence relative to the y-axis for a calibration test object that produces a value of $\alpha_y = \pm 1$, then the angle of incidence of an object generating a value $\alpha_y = A_y$, may be determined by $\theta_y * A_y$. The angle of incidence relative to the x-axis may be determined analogously.

To further appreciate the principles of the disclosure, reference will now be made to FIGS. 2B-2F, showing in a front elevation view, further aspects of the detector array 12 and reflector 13 in accordance with at least some embodiments.

Figure 2B:
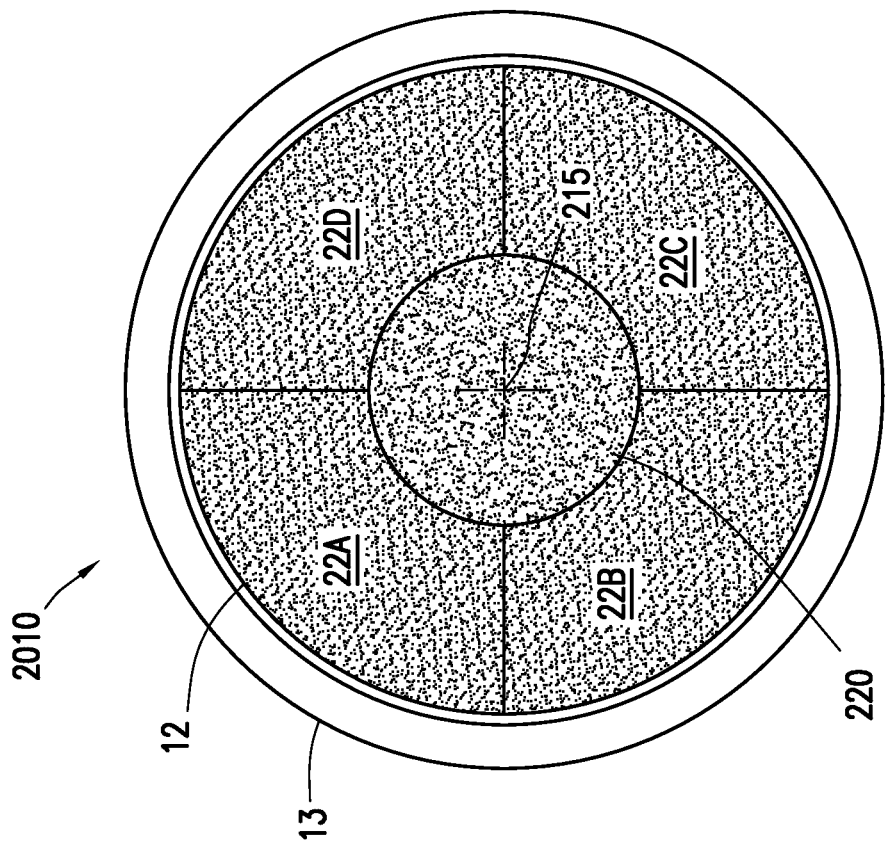
FIG. 2B shows, in a front elevation view, further aspects of a portion of the system of FIG. 2.
Figure 2B:
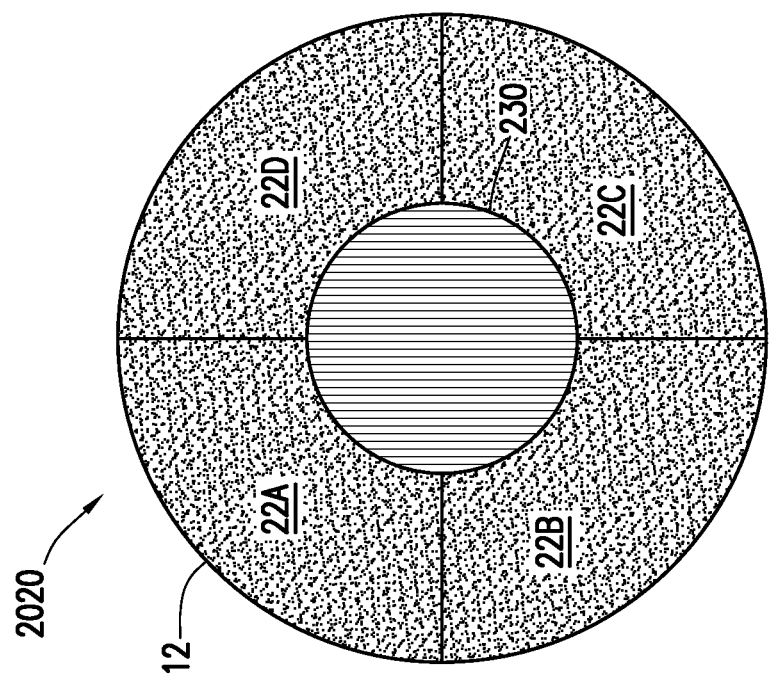

Turning now to FIG. 2B, illustrating in two views, 2010 and 2020, respectively, the image spot geometry as imaged on detector array 12 and reflector 13 and the corresponding electromagnetic energy distribution falling on the detector array 12. Spot pattern 220 represents the image spot of a distant source imaged on the combination of detector array 12 and reflector 13 in which the distant source is on-axis both azimuthally and in elevation, and within the linear FOV of detector array 12. Electromagnetic energy distribution 230 represents the electromagnetic energy falling on detector array 12 from such a source.

Figure 2C:
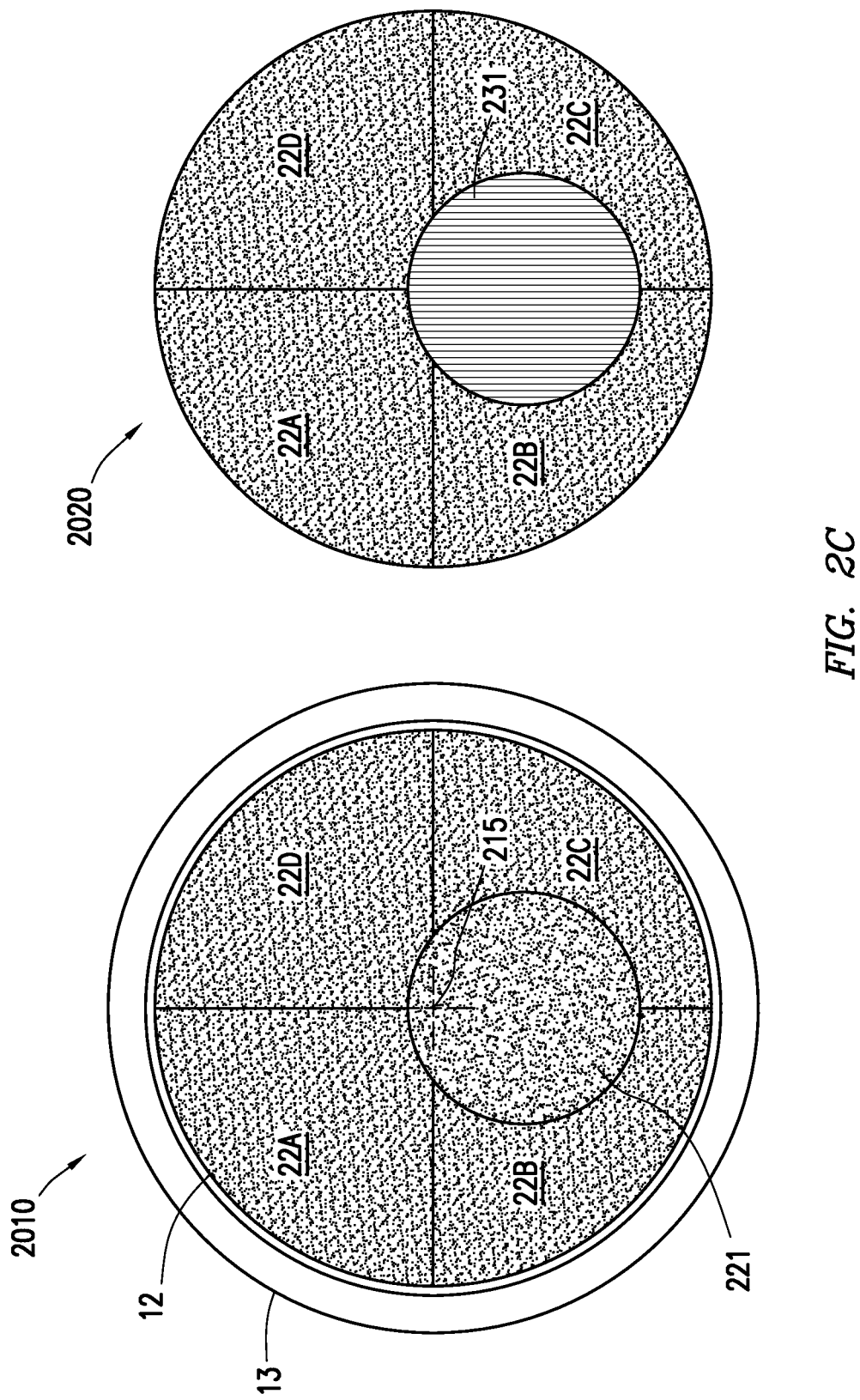
FIG. 2C shows, in a front elevation view, further aspects of a portion of the system of FIG. 2.

In FIG. 2C, in view 2010, spot pattern 221 represents the image spot of a distant source, on-axis in azimuth and off-axis in elevation, analogous to spot 208 in FIG. 2A. Spot pattern 221 corresponds to a distant source that is off-axis in elevation, but within the FOV of detector array 12. Spot pattern 221 is displaced in the vertical direction such that its centroid is below the center 215 of detector array 12. In view 2020, energy distribution 231 is similarly displaced.

Figure 2D:
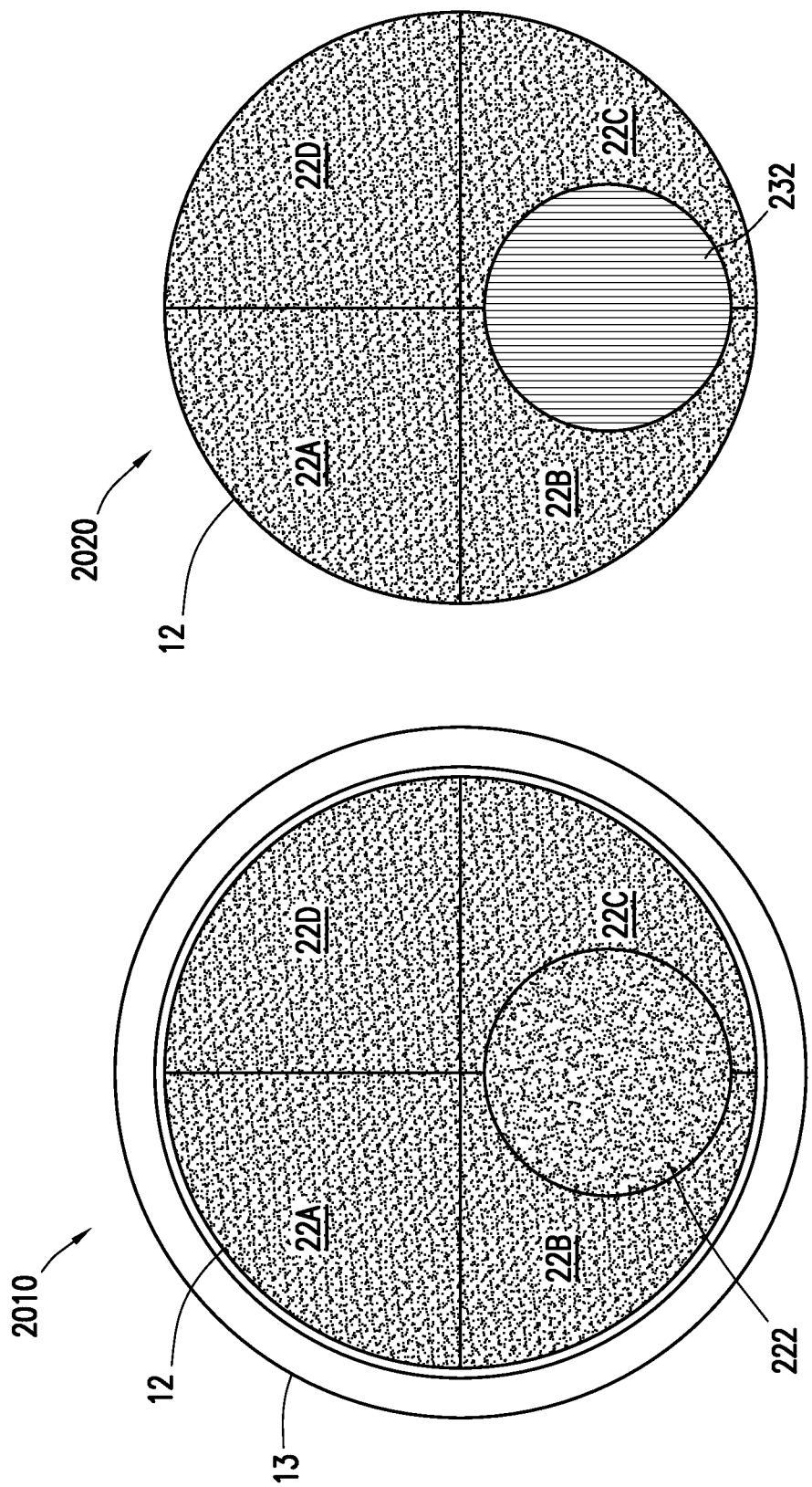
FIG. 2D shows, in a front elevation view, further aspects of a portion of the system of FIG. 2.

Referring now to FIG. 2D, in view 2010, spot pattern 222 represents the image spot of a distant source similar to spot pattern 221 in FIG. 2C, albeit disposed further off-axis. In this example, no portion of the electromagnetic energy falling on detector array 12 strikes quadrants 22A and 22D, as depicted in view 2020 by energy distribution 232. The distant source represented by image spot 222 remains within the FOR of the sensor system in accordance with an embodiment of the present disclosure, but is no longer within the FOV, as determined using equations (2) and (3) as set forth above. Stated differently, for the example of FIG. 2D, $S_A = S_D = 0$, and $S_B = S_C$, and the sensor system can no longer determine the angular position of the distant source as $\alpha_x$ and $\alpha_y = 0$, from equations (2) and (3), respectively.

Figure 2E:
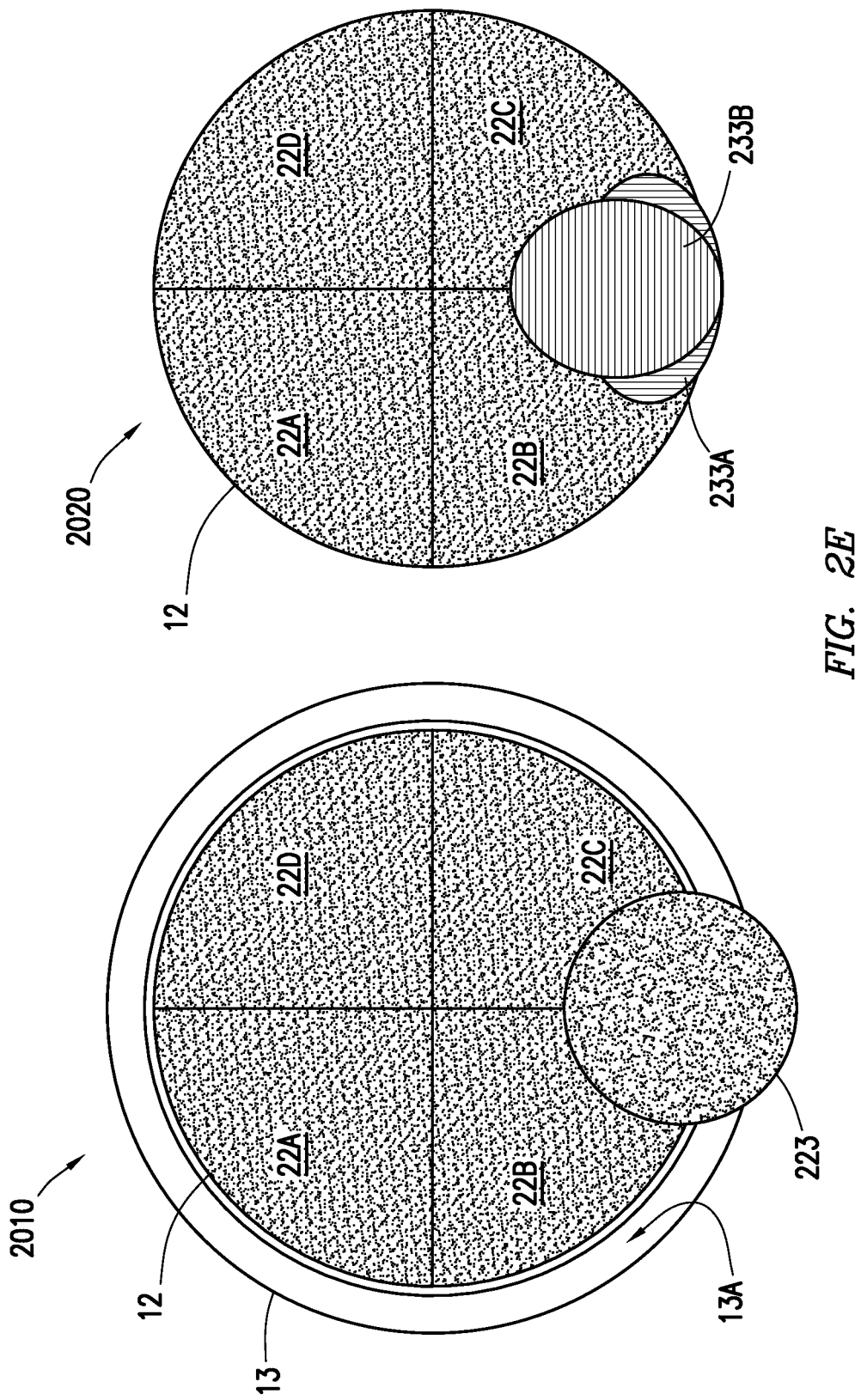
FIG. 2E shows, in a front elevation view, further aspects of a portion of the system of FIG. 2.

In FIG. 2E, in view 2010, spot pattern 223 represents the image spot of a distant source similar to spot pattern 222 in FIG. 2D, albeit disposed further off-axis still. As seen in view 2010, a portion of image spot 223 misses detector array 12 and strikes reflector 13. Reflector 13 may comprise a reflective surface 13A. The distance source represented by image spot 223 is still within the FOR of the sensor system embodiments in accordance with the principles of the disclosure. The energy distribution impinging on detector array 12 as shown in view 2020 is comprised of two portions: energy distribution 233A corresponds to the energy distribution falling directly on detector array 12, and energy distribution 233B corresponds to energy reflected off of reflector 13 and onto detector array 12.

Figure 2F:
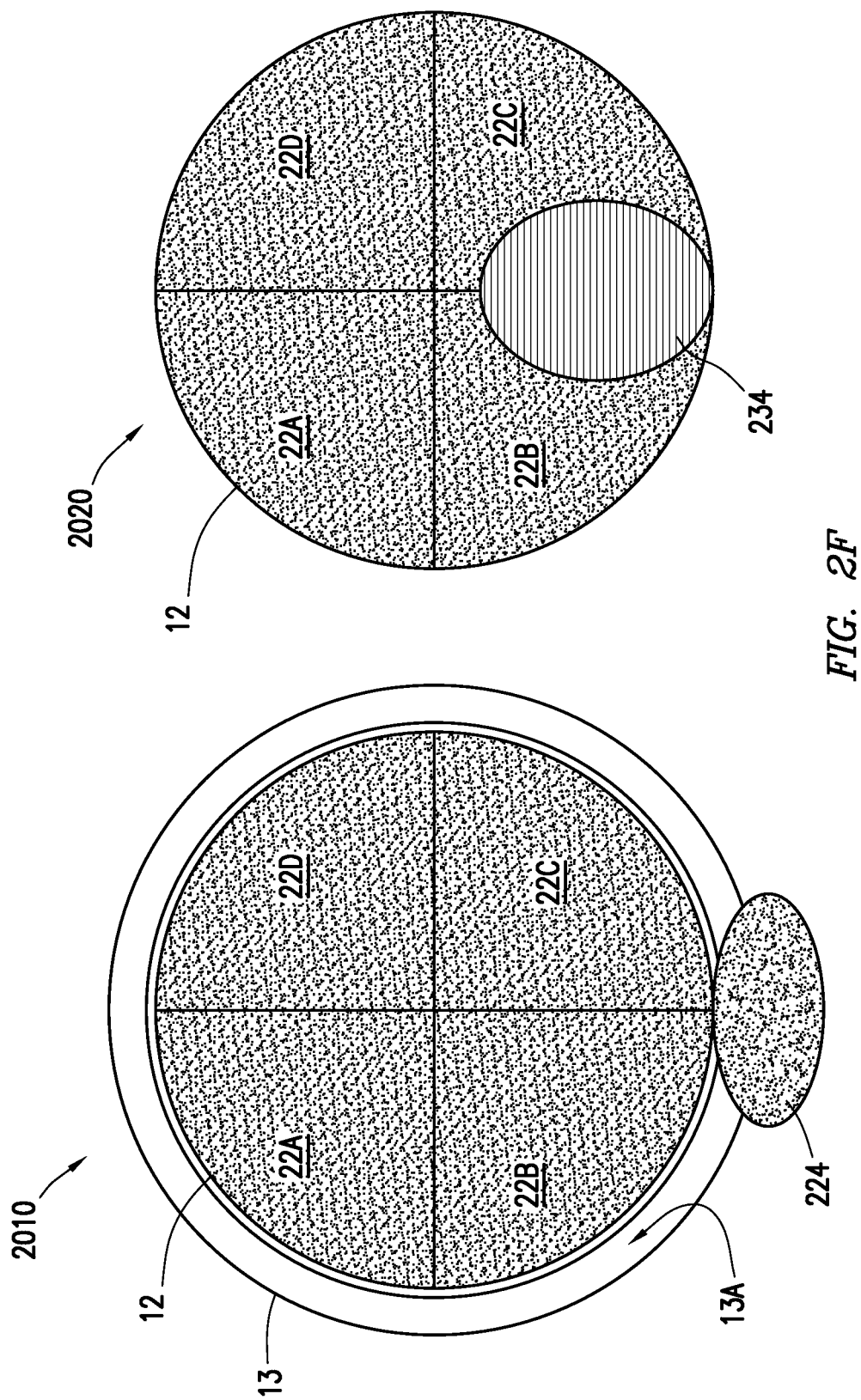
FIG. 2F shows, in a front elevation view, further aspects of a portion of the system of FIG. 2.

The spot pattern and energy distribution representing a distant source still further off axis are shown in views 2010 and 2020, respectively, of FIG. 2F. In the example of FIG. 2F, the image of the distant source represented by spot pattern 224 misses detector array 12 but strikes reflector 13. Energy distribution 234 is comprised of energy reflected off of reflector 13 and onto detector array 12. The distant source represented by spot pattern 224 and energy distribution 234 is thus within the FOR of sensor system embodiments in accordance with the principles of the disclosure.

Figure 3:
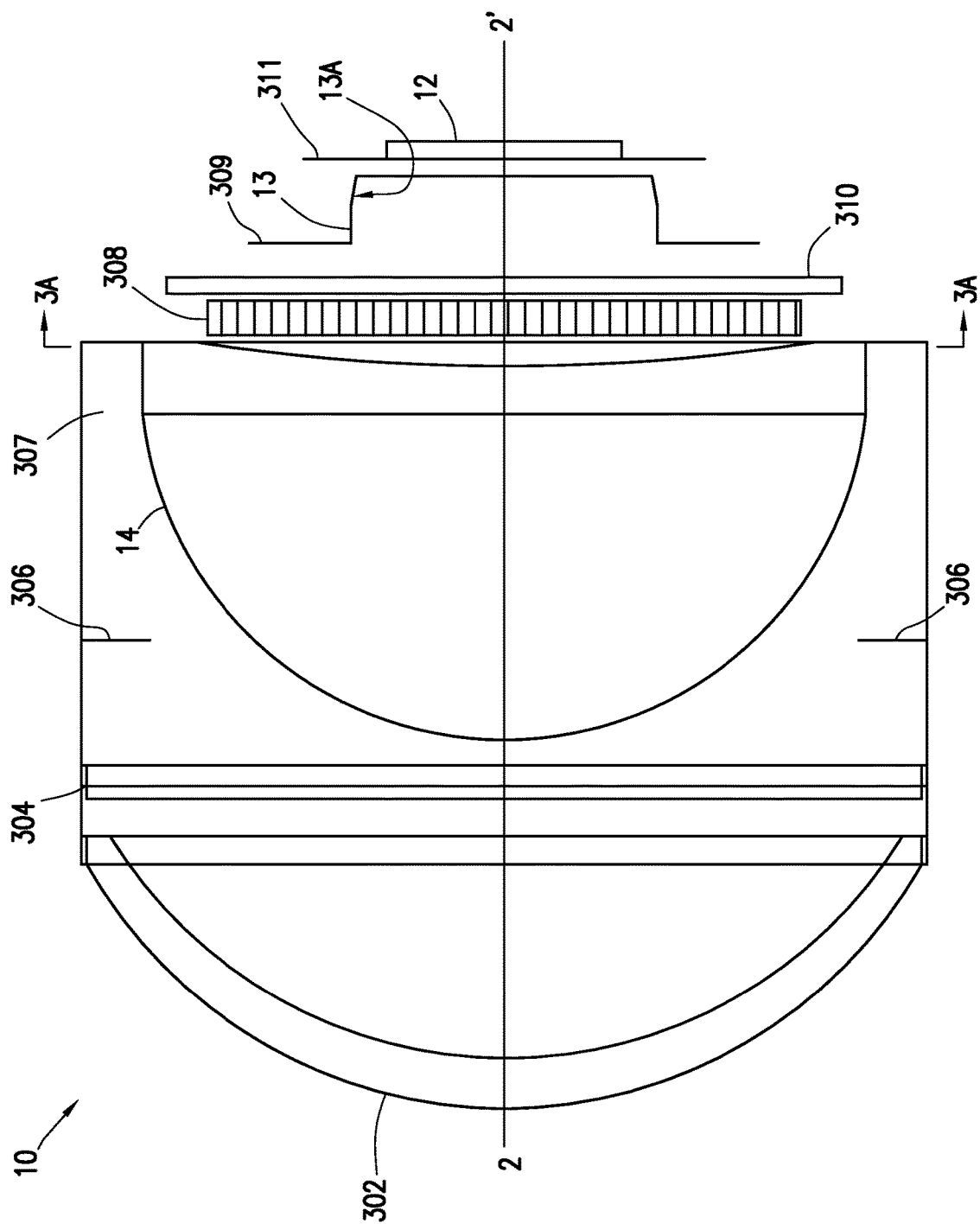
FIG. 3 shows, in a side elevation view, a sensor system in accordance with at least some embodiments.

To further appreciate the principles of the disclosure, refer now to FIG. 3 illustrating, in an elevation view, an exemplary sensor system 10 in accordance with an embodiment of the disclosure. In the exemplary sensor system 10 there may be included dome 302 and bandpass filter 304. Dome 302 primarily serves to protect other components of sensor system 10 from environmental conditions, for example in applications where sensor system 10 may be exposed to weather or other conditions that might be detrimental to the sensor system. In at least some embodiments, dome 302 may be configured to have no optical power, the dome playing the role of a window. In at least some embodiments, dome 302 may be omitted. For example, in a space-based application, there may be few if any environmental risks that would benefit from the protection provided by a dome. Similarly, bandpass filter 304 may be selected to filter out light in portions of the spectrum that are not of interest in particular application of sensor system 10 but might otherwise reach the detector. In at least some embodiments, bandpass filter 304 may be omitted. Sensor system 10 may also include an aperture stop 306 which plays a conventional role of limiting the amount of light reaching the detector in sensor system 10. In at least some embodiments, aperture stop 306 may be omitted. Lens system 14 may comprise a converging lens system that refracts light impinging on sensor system 10 onto detector array 12 and reflector 13. Lens system 14 and bandpass filter 304 may be enclosed within a housing 307.

Sensor system 10 may further comprise reflector 13 disposed about detector array 12. In the exemplary embodiment of FIG. 3, reflector 13 comprises reflecting surface 13A. A lenslet array 308 may be disposed between lens system 14 and reflector 13. In at least some embodiments, a lenslet array or other optical diffusing element, for example opal glass, may be used to conjunction with incoming radiation that is coherent, such as from a laser source. Such a light source may be subject to a self-interference phenomenon commonly referred to a speckle. The image on the detector array might thereby be subject to amplitude fluctuations that could be sensed by the detector array and affect the determination of the angle of incidence as set forth above. In an embodiment incorporating a lenslet array or other optical diffusing element, the temporal variations may be substantially removed. Further, in at least some embodiments, an optical window 310 may be included to protect detector array 12 from the environment. In the illustrated embodiment, dome 302, bandpass filter 304, aperture stop 306, lens system 14, lenslet array 308 and reflector 13 may be axially symmetric about axis 2-2'. Further, as described above, detector array 12 may be comprised of a photosensitive material and further comprised plurality of elements; four in the example shown in FIGS. 1A,1B, and 2A-2F. Such an embodiment might have four-fold symmetry about axis 2-2' in FIG. 3.

In alternative embodiments of a sensor system in accordance with the principles described herein, reflector 13 may be configured to conform to the geometry of the detector array. Thus, in the exemplary embodiment illustrated in FIG. 3, reflector 13 as set forth above may be axially symmetric about axis 2-2'. In an alternative embodiment having a square or rectangular detector array, for example, reflector 13 may be segmented so as to substantially conform to the perimeter of the detector array perimeter.

In at least some embodiments, baffles 309 and 311 may be provided. These may be coated with an anti-reflective material to suppress stray light from off-axis sources that might scatter onto the reflector or detector array.

In at least some embodiments, surface 13A of reflector 13 may be formed from a series of annular mirror segments comprising concave surfaces. Abutting edges of adjacent segments may be substantially equal whereby the transitions between segments are contiguous. In other words, adjacent edges of each of the segments are configured to form a contiguous transition between segments. The mirrored surface may be comprised of aluminum. In alternative embodiments, the surface may be comprised of a glass, other metals such as silver, gold or titanium, or a coated plastic. The foregoing fabrication techniques are exemplary and not limiting and any suitable method of forming reflector 13 may be used.

In yet other embodiments, surface 13A may be formed from a single contiguous structure. In particular, in some embodiments, surface 13A may, in section, have a continuous curvilinear form. For example, in a planar section similar to the elevation view of FIG. 3, one such form may comprise a cubic-spline curve. Implementation of such an embodiment comprising continuous curvilinear forms may be effected on optical system computer-aided design (CAD) software such as Zemax from Radiant Zemax, LLC. The cubic spline form is exemplary, and other embodiments formed from a single contiguous structure may be used in accordance with the principles of the disclosure.

Figure 3A:
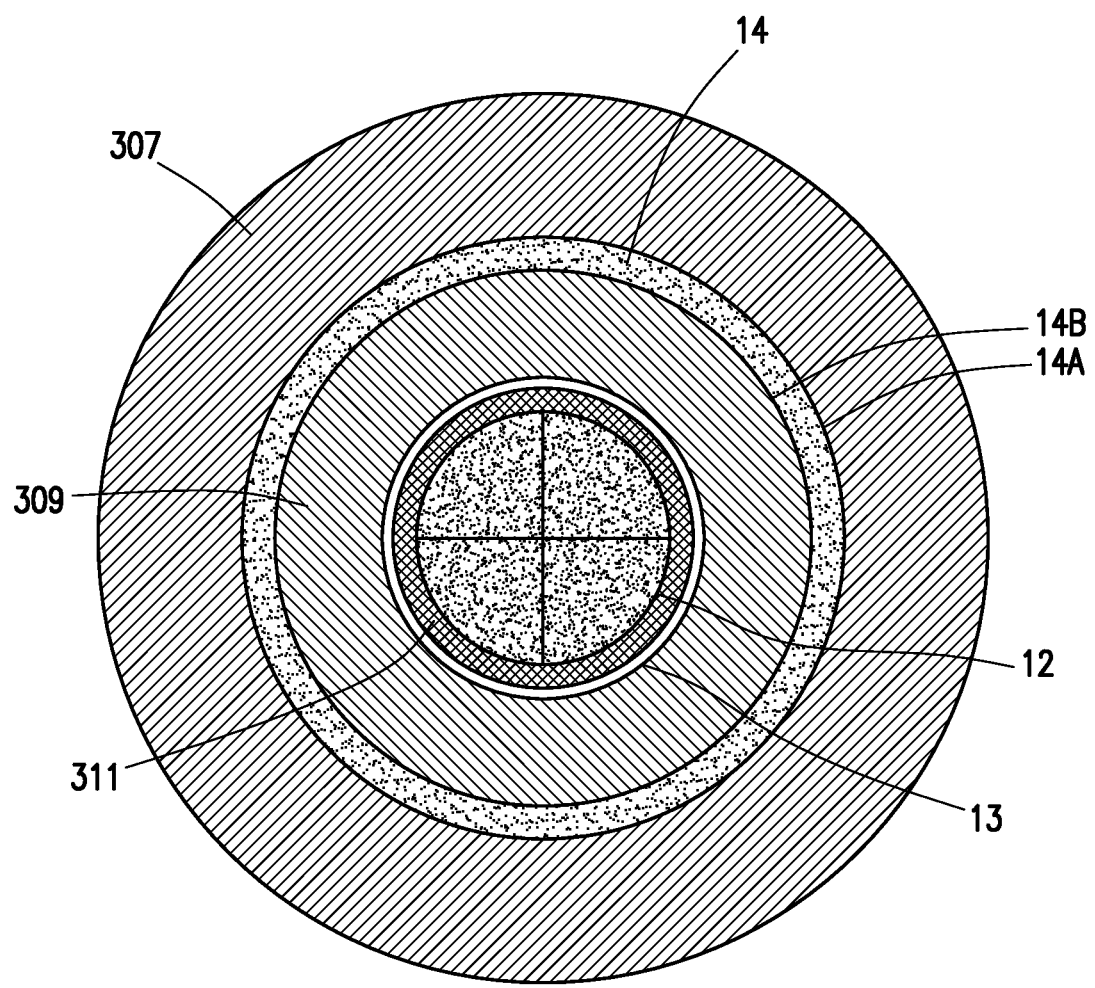
FIG. 3A shows, in a front elevation view, a section through the sensor system of FIG. 3.

FIG. 3A shows a front-elevation, transverse cross-sectional view through 3A-3A of detector system 10. In FIG. 3A, lenslet 308 has not been shown for ease of illustration. In FIG. 3A, lens aperture edges 14A, 14B are seen.

Figure 4:
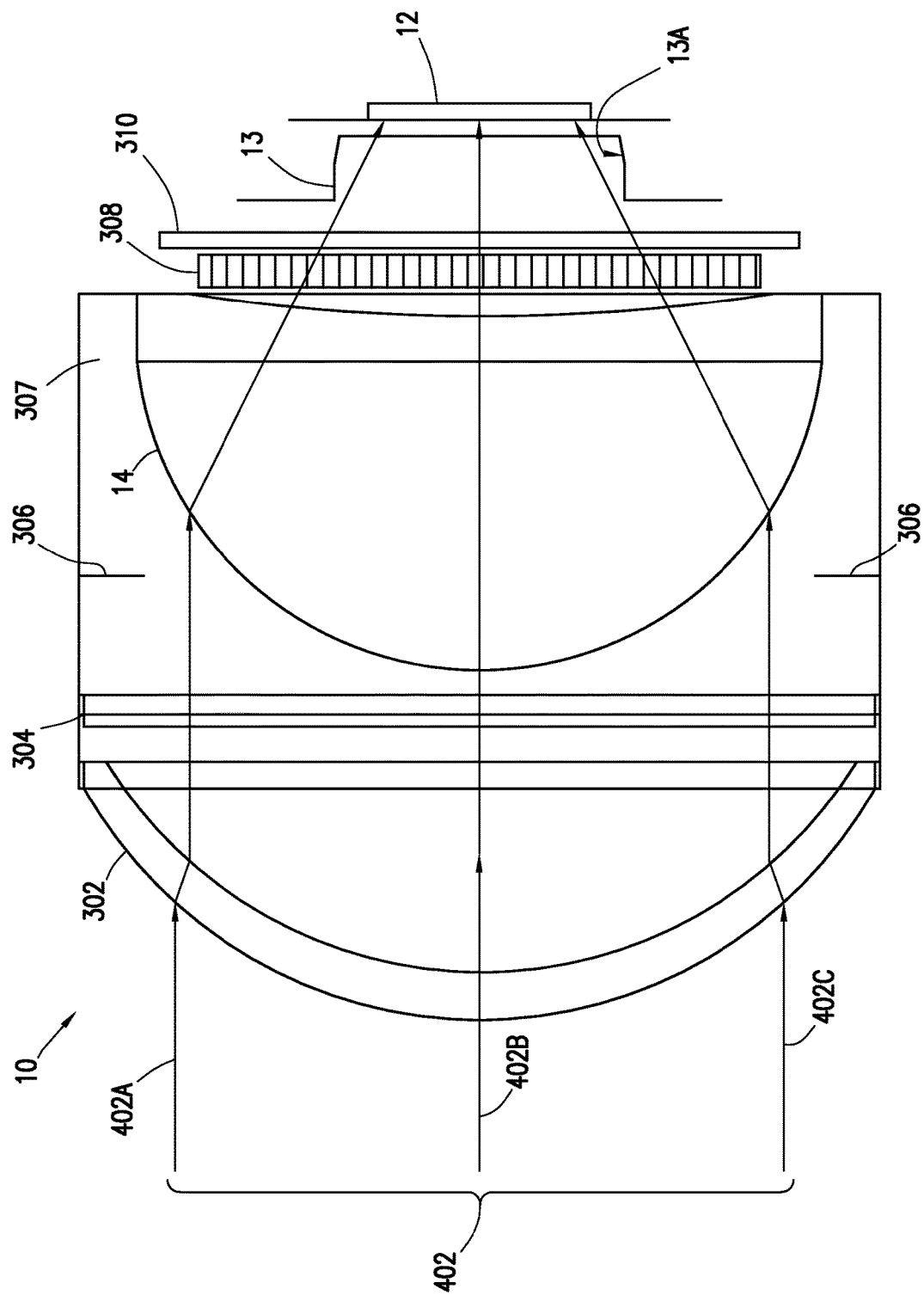
FIG. 4 shows, in a side elevation view, additional aspects of the sensor system of FIG. 3.
Figure 5:
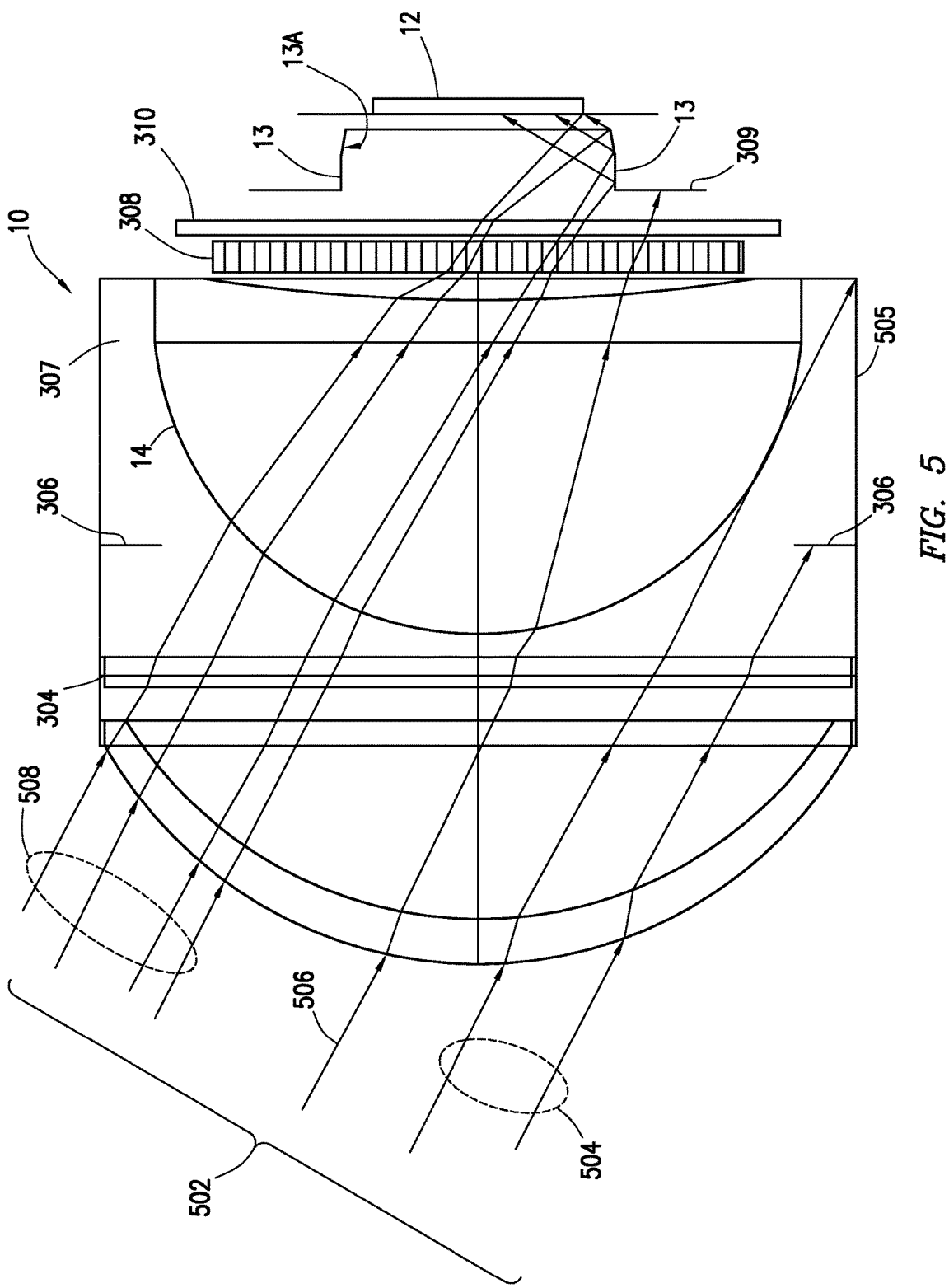
FIG. 5 shows, in a side elevation view, additional aspects of the sensor system of FIG. 3.

To further appreciate the principles of the disclosed embodiments, FIGS. 4 and 5 show the propagation of exemplary light rays through sensor system 10.

Referring first to FIG. 4 there is shown, in a side elevation view the propagation of an exemplary set of axial light rays 402 through a sensor system 10 in accordance with an embodiment of the disclosure. Light rays 402 may, for example, represent the light rays from an on-axis distant point object. Axial light rays 402 are imaged onto detector array 12 by lens system 14. Marginal rays 402A and 402C are imaged at the periphery of detector array 12, and central ray 402B is imaged substantially at the center of detector array 12.

Referring now to FIG. 5 there is shown, in a side elevation view, the propagation of an exemplary set of oblique light rays 502 through a sensor system 10 in accordance with an embodiment of the disclosure. Oblique rays 502 may represent light rays from an off-axis distant object. Further, such object may be disposed near the limit of the FOR of the sensor system 10. In that respect, a portion 504 of the rays impinge on internal portions of a housing portion 505 or aperture stop 306 and do not reach lens system 14. Another portion, exemplified by ray 506 impinge on lens system 14 but the image thereof does not fall on either detector array 12 or reflector 13, but may be absorbed on a housing portion 507. A portion of the illumination, 508 is imaged onto reflector 13. As described above in conjunction with FIGS. 2E and 2F, illumination striking reflector 13 may reflect from surface 13A thereof onto detector array 12. The FOR of sensor system 10 in the example of FIG. 5 includes the object (not shown in FIG. 5) corresponding to the set of rays 502, wherein the FOR is defined by the extent of reflector 13.

Thus, a sensor system in accordance with the principles of the disclosure of which sensor system 10 is exemplary may be used to provide an increased FOR in hybrid imaging-nonimaging applications for example, situational awareness, or for example, satellite borne environmental monitoring, or monitoring of astronomical objects such as asteroids. For objects disposed at angular positions within the FOR such that the illumination provided therefrom is imaged on the detector array, the object may be imaged onto the detector array. The radiation from objects that are within the field FOR of sensor system embodiments having a virtual detector in accordance with the principles of the disclosure, while not necessarily forming an image thereof, nonetheless provide detection and positional information data with respect to such objects. If an image of the detected object is desired, the data may then be used to reposition the device employing the sensor system accordingly. For example, if the sensor system is employed in a semi-active laser (SAL) system in a missile or other guided projectile, the data may be used by the steering apparatus to reposition the projectile such that the object is imaged directly onto the detector array. In an exemplary embodiment employing a sensor system in accordance with the disclosed principles in a satellite borne application, the data may be used to control a gimbaled mount in accordance with techniques familiar in the art whereby the pointing of the sensor system may be adjusted to image a detected object directly onto the detector array.

The above discussion is meant to be illustrative of the principles and various embodiments of the present invention. Numerous variations and modifications will become apparent to those skilled in the art once the above disclosure is fully appreciated. For example, various lens configurations may be employed in the implementation of a converging lens system. It is intended that the following claims be interpreted to embrace all such variations and modifications.

What is claimed is:

1. A system, comprising:
   a detector;
   a reflector disposed about and proximal to the detector, at least of portion of the reflector being disposed in front of the detector; and
   wherein the reflector is configured to reflect at least a portion of the radiation directed to the system at an angle greater than a first predetermined value onto the detector, and wherein the system is configured so that at least a portion of the radiation directed to the system at an angle less than the first predetermined value directly impinges on the detector, wherein substantially no radiation directed to the system at an angle greater than a second predetermined angle impinges on the detector and wherein a first portion of the radiation directed to the system at an angle between the first and second predetermined angles impinges directly on the detector and a second portion of the radiation directed to the system at an angle between the first and second predetermined angles impinges on the detector by reflection from the reflector.

2. The system of claim 1 wherein the second predetermined angle comprises the field of regard (FOR) of the system.

3. The system of claim 1 wherein the detector comprises a multi-segment detector array.

4. The system of claim 1 further comprising a lens system disposed in front of the detector and the reflector, the lens system configured to refract radiation directed to the system at an angle less than the first predetermined angle onto the detector.

5. The system of claim 1 wherein the first predetermined angle is determined from a size of the detector and a distance between the detector and a lens system configured to refract light impinging on the system onto the detector.

6. The system of claim 1 wherein the second predetermined angle is determined from a size of the reflector and a distance between the detector and a lens system configured to refract light impinging on the system onto the detector.

7. The system of claim 4 wherein the lens system is configured to refract the portion of the radiation directed to the system at an angle greater than the first predetermined angle onto the reflector.

8. The system of claim 4 wherein the lens system comprises a converging lens.

9. The system of claim 4 wherein the lens system is configured to image on the detector an object disposed at an angle from an axis of the system less than the first predetermined angle.

* * * * *